United States Patent [19]
Reiner et al.

[11] Patent Number: 4,941,365
[45] Date of Patent: Jul. 17, 1990

[54] DEVICE FOR DETERMINING THE MASS OF A MOTOR VEHICLE

[75] Inventors: Klaus Reiner, Fellbach-Schmiden; Heinz Rieker, Waldenbuch; Josef Stoll, Remseck, all of Fed. Rep. of Germany

[73] Assignee: Daimler-Benz AG, Fed. Rep. of Germany

[21] Appl. No.: 436,028

[22] Filed: Nov. 14, 1989

[30] Foreign Application Priority Data

Dec. 24, 1988 [DE] Fed. Rep. of Germany ....... 3843818

[51] Int. Cl.$^5$ ...................... G01D 21/00; G01G 19/08
[52] U.S. Cl. ...................... 73/865; 177/136; 364/567
[58] Field of Search ........................ 177/136; 73/865; 364/567

[56] References Cited
U.S. PATENT DOCUMENTS

| | | | |
|---|---|---|---|
| 4,539,650 | 9/1985 | Griffen et al. | 177/136 |
| 4,548,079 | 10/1985 | Klatt | 73/865 |
| 4,646,876 | 4/1987 | Fremd | 73/865 |

FOREIGN PATENT DOCUMENTS 0111636  9/1983  Fed. Rep. of Germany .

*Primary Examiner*—George H. Miller, Jr.
*Attorney, Agent, or Firm*—Everson, Wands, Edwards, Lenahan & McKeown

[57] ABSTRACT

Device for determining the mass of a motor vehicle by determining the running resistance of the vehicle with the clutch in the drive train disengaged, and by repeatedly determining the torque of the engine and, at the same time, repeatedly measuring the vehicle acceleration with the clutch engaged and by taking into account the ratio of the transmission, an average value of the vehicle mass can be determined with a high degree of accuracy.

20 Claims, 2 Drawing Sheets

DEVICE FOR DETERMINING THE MASS OF A MOTOR VEHICLE

BACKGROUND AND SUMMARY OF THE INVENTION

The invention relates to a device for determining the mass of a motor vehicle utilizing signals from: signal transmitters for the engine torque, signal transmitters for the speed and acceleration of the vehicle, signal transmitters for the state of a clutch between the engine and drive train and wherein a computer evaluates the signals from these signal transmitters. The device determines a coefficient for the running resistance of the vehicle during a first operating phase with the clutch disengaged. The device repeatedly determines values for the acceleration of the vehicle during a second operating phase with the clutch engaged. A value correlated with the mass of the vehicle is calculated repeatedly by forming the quotient of the engine torque, determined during the second operating phase, and a quantity dependent on the difference between the acceleration value and the running resistance.

A corresponding device is the subject of European Patent Specification 0,111,636. This publication makes use of the knowledge that the mass of a motor vehicle can be determined (with its rotating masses being ignored) by forming a difference quotient between two values of the drive torque determined at different moments and the difference between two values of the vehicle acceleration determined at corresponding moments. The calculation can be simplified, with the accuracy being enhanced at the same time, if one moment is located in an operating phase with a vanishing drive torque, that is to say an operating phase in which the clutch connecting the engine to the drive train is disengaged (see lines 9 to 12 on page 3 of European Patent Specification 0,111,636). The attainable accuracy is nevertheless still not fully satisfactory.

The object of the instant invention is to provide a device of a similar character which makes it possible to enhance the accuracy of the determination of the mass substantially.

According to the invention, this object is achieved by virtue of the fact that a signal transmitter reproducing the particular transmission ratio is provided and the mass is determined by means of a computer, according to:

$$m_{Ei} = \frac{\eta \cdot i_G/r}{b_{ei} - b_a} M_{Mi} - \frac{b_{ei} \cdot i_G^2/r^2}{b_{ei} - b_a} J_M$$

in which
$b_{ei}$=acceleration values of the vehicle with the clutch engaged
$\eta$=the efficiency of the drive train
$i_G$=ratio of the transmission
$r$=dynamic rolling radius of the drive wheels
$J_M$=moment of inertia of the engine
$M_{Mi}$=values of the drive torques and engine torques The invention takes into consideration the fact that the moment of inertia of the vehicle engine represents a considerable quantity and should therefore be taken into account in the calculation of the vehicle mass.

Moreover, the invention makes it possible to achieve an enhanced accuracy because the coefficient of running resistance is evaluated very precisely and the signals representing the engine torque and acceleration are evaluated repeatedly during an engine operating phase with the clutch engaged.

According to a preferred embodiment of the invention, there is also a brake-signal transmitter which makes it possible to ensure that signals of the signal transmitters, which are generated when the brake is being actuated, are ignored, that is to say only those signals generated when the vehicle brake is not being actuated are used to determine the vehicle mass.

The values of the vehicle acceleration can be determined from the running speed by determining the difference quotient from the difference between two speed values measured at different moments and the time interval of these two measurements.

Since the acceleration of the vehicle always fluctuates about an average value, it is expedient if a multiplicity of measurements is carried out during a predetermined time period and an average value of these measurements formed. This can prevent the possibility that vibrations in the drive train, or comparatively high-frequency fluctuations of the values of the vehicle speed and acceleration, will result in a falsification of the value of the mass determined.

As a signal transmitter for the particular transmission ratio, revolution transmitters can be provided on the input side and output side of the transmission and the computer can calculate from their output, the quotient of the rates of revolutions on the input and output sides and consequently the transmission ratio.

In order to determine the drive torque, there can be a signal transmitter, the signals of which represent the particular position of the injection pump on a diesel engine, or of the throttle flap in a gasoline engine. If characteristic engine data of the particular injection-pump or throttle-flap position and the related revolution of the engine are stored in the computer, the latter can determine the drive torque or engine torque directly.

It is advantageous if there is a brake-signal transmitter provided to indicate if vehicle brakes are applied and that signals from the remaining signal transmitters, generated when the brake is being actuated, are ignored.

It is also advantageous if the acceleration signals are determined through successive speed measurements and times with the values being averaged.

The ratio of the transmission is obtained through revolution transmitters arranged on the input and output side of the transmission.

The computer can assign a value for the particular engine torque ($M_{Mi}$) in response to a signal transmitter representing the position of the accelerator pedal, or the operating state of the injection pump of the engine, when engine data is stored in the computer. The computer additionally takes into account the rate of revolutions of the engine.

It is advantageous if the signals representing the acceleration ($b_a$, $b_{ei}$) are utilized only below a limiting speed. This will reduce the influence of the air resistance of the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
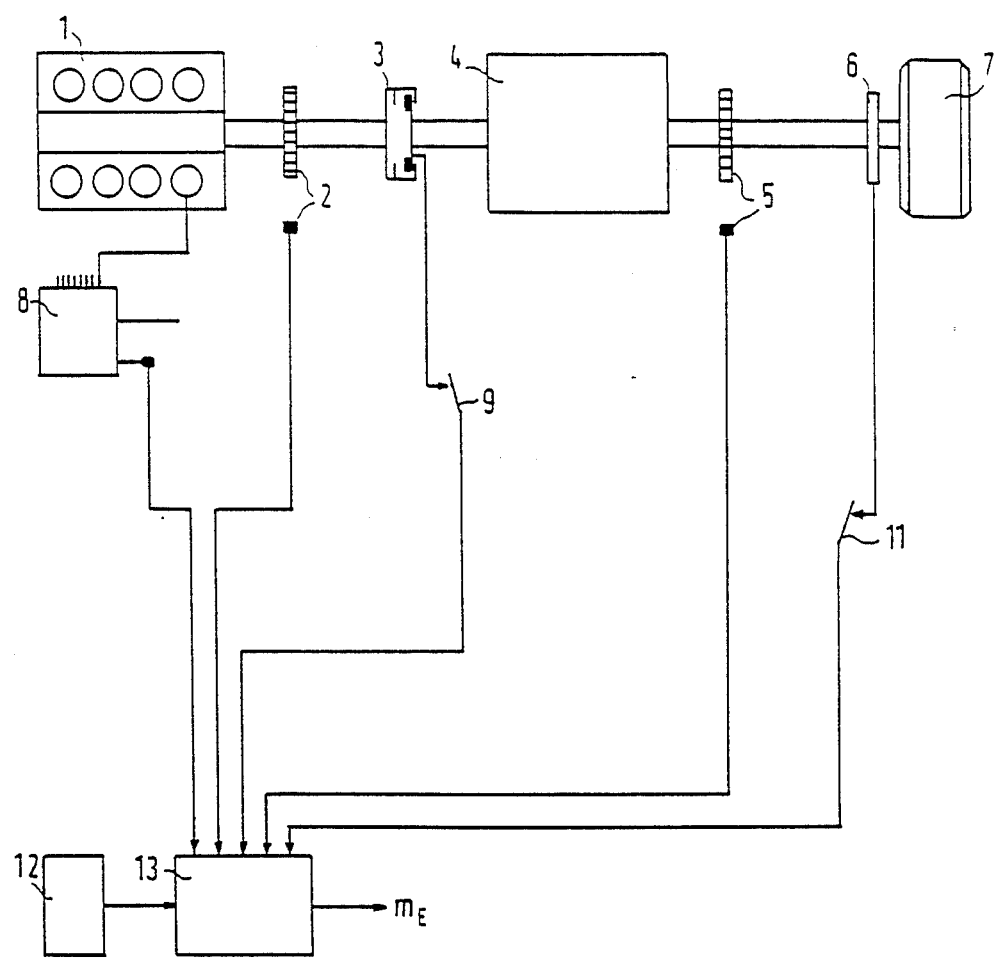
FIG. 1 shows a diagrammatic representation of the drive train of a motor vehicle with the inventive device for determining the vehicle mass.

FIG. 1 shows an engine 1 of the vehicle connected to the input side of a transmission 4 via a clutch 3. The output side of the transmission 4 is drivingly connected to vehicle drive wheels 7 (only one of which is shown). Arranged between the engine 1 and clutch 3 is a revolution transmitter 2 which reproduces the rate of revolutions of the engine with the clutch 3 disengaged and the input rate of revolutions of the transmission 4 with the clutch 3 engaged. Arranged on the output side of the transmission 4 is a further revolution transmitter 5 which reproduces the rate of revolutions of the drive wheels 7 and consequently the vehicle running speed and, in conjunction with the revolution counter 2 of the engine and with the clutch 3 engaged, offers the possibility of determining the particular speed ratio of the transmission 4.

The drive torque of the engine 1 is controlled by its fuel injection pump 8 which is itself actuated in dependence on the position of the vehicle accelerator pedal.

A computer 13 serves for determining the mass of the vehicle and is connected to a memory 12 which contains characteristic data of the engine 1.

The computer 13 receives signals from the injection pump 8 which represent the particular operating state of the injection pump 8 or in the case of a non-injected engine this could be replaced by the position of the throttle flap of the engine. Furthermore, the signals of the revolution counter 2 are fed to the computer 13, so that the computer 13 can determine the engine drive torque from the operating state of the injection pump 8, the rate of revolutions of the engine determined by the revolution transmitter 2 and the characteristic data of the engine contained in the memory 12.

Moreover, the computer 13 is coupled to a signal transmitter 9 which indicates whether the clutch 3 is disengaged or engaged.

In addition, the computer 13 is connected to the revolution transmitter 5 and to a signal transmitter 11 which indicates whether the brake 6 of the vehicle is being actuated or not.

With the clutch 3 engaged, the computer can determine from the signals of the revolution transmitters 2 and 5 the ratio of the transmission 4 and the trend of the running speed.

With the clutch 3 disengaged and with the brake 6 not being actuated, the computer determines the coefficient of running resistance "$f_E$" of the vehicle from the signals of the revolution transmitter 5 as follows:

$$f_E = b_a/g,$$

in which $f_E$ = a quantity dependent on the running resistance (coefficient)

$b_a$ = the acceleration of the vehicle with the clutch disengaged g = gravitational acceleration.

Figure 2:
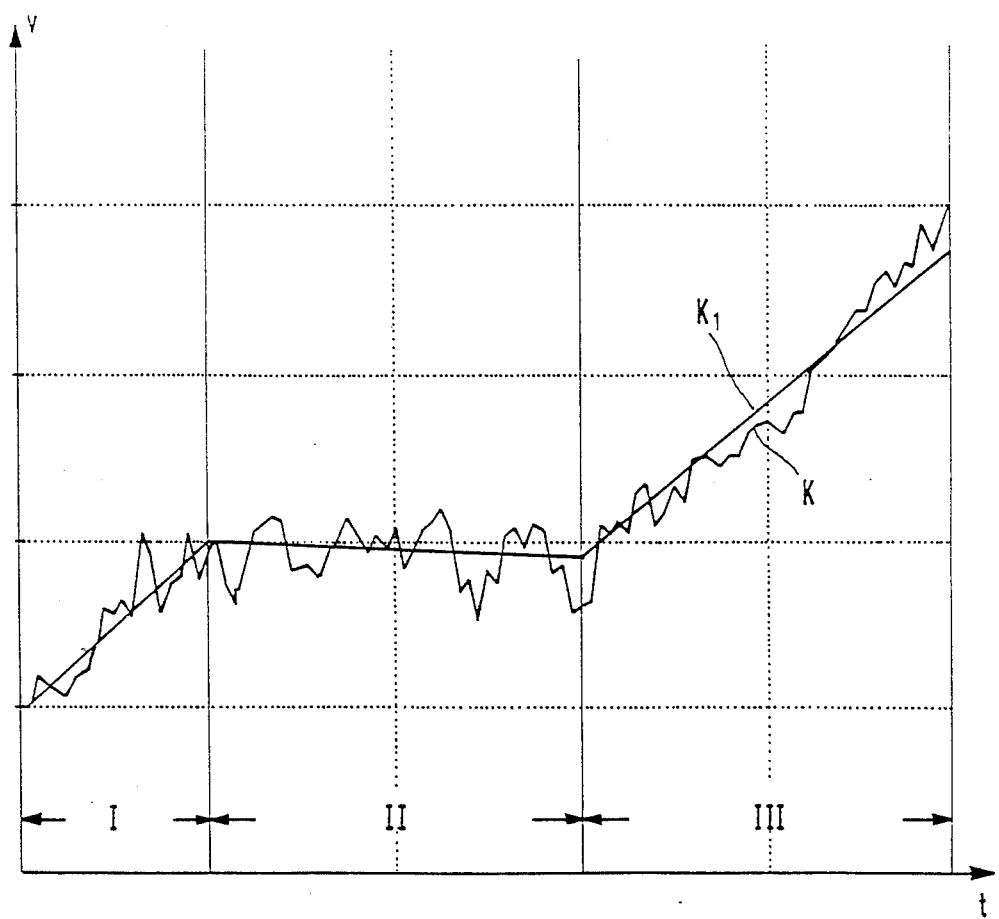
FIG. 2 shows a graph representing the vehicle speed v as a function of the time t during an acceleration phase which is interrupted by an operating phase of the vehicle with the clutch disengaged.

During a second operating phase with the clutch engaged, values for the acceleration of the vehicle are determined repeatedly and a value "$M_E$" correlated with the mass of the latter is calculated according to:

$$m_{Ei} = \frac{\eta \cdot i_G/r}{b_{ei} - b_a} M_{Mi} - \frac{b_{ei} \cdot i_G^2/r^2}{b_{ei} - b_a} J_M$$

in which $b_{ei}$ = acceleration values of the vehicle with the clutch engaged $\eta$ = the efficiency of the drive train $i_G$ = ratio of the transmission r = dynamic rolling radius of the drive wheels $J_M$ = moment of inertia of the engine $M_{Mi}$ = values of the drive torques and engine torques FIG. 2 shows the trend of the vehicle speed v as a function of the time t. Here, the speed first increases during phase I. During phase II, the clutch 3 is then disengaged because there is to be a gearshift in the transmission 4. During the phase II therefore, the vehicle coasts along until, at the start of phase III, the clutch 3 is engaged again and the speed v of the vehicle increases once more because the accelerator pedal is pressed to a corresponding extent.

The curve K representing the vehicle speed shows relatively high-frequency fluctuations of the speed. To prevent these high-frequency fluctuations from leading to a falsification of the result of the vehicle mass, an averaging, the result of which can be represented as a curve $K_1$, is carried out. On the basis of the values of the speed v which are represented by the curve $K_1$, an average acceleration of the vehicle for the phase II and at least for one of the phases I or III can then be calculated. These averaged acceleration values are then used to calculate the vehicle mass.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Device for determining the mass of a motor vehicle utilizing signal transmitters for vehicle engine torque, signal transmitters for vehicle speed and acceleration, signal transmitters for indicating engagement states of a clutch between the vehicle engine and vehicle drive train and a computer evaluating the signals from these signal transmitters;

wherein, during a first operating vehicle phase and with the clutch disengaged, the computer determines a coefficient for the running resistance of the vehicle in accordance with the equation $$f_E = b_a/g,$$

in which $f_E$ = a coefficient dependent on the running resistance $b_a$ = the acceleration value of the vehicle with the clutch disengaged g = gravitational acceleration;

wherein during a second operating vehicle phase with the clutch engaged, the computer repeatedly determines values for the acceleration of the vehicle;

wherein the computer then repeatedly determines a value correlated with the mass of the vehicle by forming a quotient of engine torque, determined repeatedly during the second operating phase, and a quantity dependent on the difference between a vehicle acceleration value and the vehicle coefficient of running resistance;

wherein a signal transmitter device reproduces the particular ratio of the transmission; and wherein the computer calculates a value $m_{Ei}$ correlated with the vehicle mass according to $$m_{Ei} = \frac{\eta \cdot i_G/r}{b_{ei} - b_a} M_{Mi} - \frac{b_{ei} \cdot i_G^2/r^2}{b_{ei} - b_a} J_M$$

in which $b_{ei}$ = acceleration values of the vehicle with the clutch engaged
$\eta$ = the efficiency of the drive train
$i_G$ = ratio of the transmission
$r$ = dynamic rolling radius of the drive wheels
$J_M$ = moment of inertia of the engine
$M_{Mi}$ = values of the drive torques and engine torques.

2. Device according to claim 1, wherein a brake-signal transmitter is provided to input into the computer when vehicle brakes are being applied and wherein the computer ignores signals from the other signal transmitters when a signal from the brake-signal transmitter is received.

3. Device according to claim 2, wherein the acceleration values $b_a$, $b_{ei}$ are determined by the computer through successive speed measurements and by forming difference quotients from the difference between two speed values measured at different moments and the time interval of the two measurements.

4. Device according to claim 3, wherein characteristic data of the vehicle engine are stored in the computer and wherein the computer can assign the particular engine torque $M_{Mi}$ in response to a signal representing the amount of fuel fed to the engine and the stored characteristic data.

5. Device according to claim 3, wherein the computer only considers signals representing the acceleration $b_a$, $b_{ei}$ values below a vehicle limiting speed in order to reduce the influence of the air resistance of the vehicle.

6. Device according to claim 2, wherein the computer determines the gear ratio of the transmission in response to a signal from a revolution transmitter arranged on an input side of the transmission and a signal from a revolution transmitter arranged on the output side of the transmission.

7. Device according to claim 6, wherein characteristic data of the vehicle engine are stored in the computer and wherein the computer can assign the particular engine torque $M_{Mi}$ in response to a signal representing the amount of fuel fed to the engine and the stored characteristic data.

8. Device according to claim 2, wherein characteristic data of the vehicle engine are stored in the computer and wherein the computer can assign the particular engine torque $M_{Mi}$ in response to a signal representing the amount of fuel fed to the engine and the stored characteristic data.

9. Device according to claim 1, wherein the acceleration values $b_a$, $b_{ei}$ are determined by the computer through successive speed measurements and by forming difference quotients from the difference between two speed values measured at different moments and the time interval of the two measurements.

10. Device according to claim 9, wherein the computer determines the gear ratio of the transmission in response to a signal from a revolution transmitter arranged on an input side of the transmission and a signal from a revolution transmitter arranged on the output side of the transmission.

11. Device according to claim 10, wherein characteristic data of the vehicle engine are stored in the computer and wherein the computer can assign the particular engine torque $M_{Mi}$ in response to a signal representing the amount of fuel fed to the engine and the stored characteristic data.

12. Device according to claim 9, wherein characteristic data of the vehicle engine are stored in the computer and wherein the computer can assign the particular engine torque $M_{Mi}$ in response to a signal representing the amount of fuel fed to the engine and the stored characteristic data.

13. Device according to claim 9, wherein the computer only considers signals representing the acceleration $b_a$, $b_{ei}$ values below a vehicle limiting speed in order to reduce the influence of the air resistance of the vehicle.

14. Device according to claim 1, wherein the computer determines the gear ratio of the transmission in response to a signal from a revolution transmitter arranged on an input side of the transmission and a signal from a revolution transmitter arranged on the output side of the transmission.

15. Device according to claim 14, wherein characteristic data of the vehicle engine are stored in the computer and wherein the computer can assign the particular engine torque $M_{Mi}$ in response to a signal representing the amount of fuel fed to the engine and the stored characteristic data.

16. Device according to claim 14, wherein the computer only considers signals representing the acceleration $b_a$, $b_{ei}$ values below a vehicle limiting speed in order to reduce the influence of the air resistance of the vehicle.

17. Device according to claim 1, wherein characteristic data of the vehicle engine are stored in the computer and wherein the computer can assign the particular engine torque $M_{Mi}$ in response to a signal representing the amount of fuel fed to the engine and the stored characteristic data.

18. Device according to claim 17, wherein the computer additionally takes into account the rate of revolutions of the engine.

19. Device according to claim 17, wherein the computer only considers signals representing the acceleration $b_a$, $b_{ei}$ values below a vehicle limiting speed in order to reduce the influence of the air resistance of the vehicle.

20. Device according to claim 1, wherein the computer only considers signals representing the acceleration $b_a$, $b_{ei}$ values below a vehicle limiting speed in order to reduce the influence of the air resistance of the vehicle.

* * * * *